R. F. O. G. VAN ZOELEN.
LUBRICATING DEVICE.
APPLICATION FILED MAY 15, 1907.
943,959.
Patented Dec. 21, 1909.
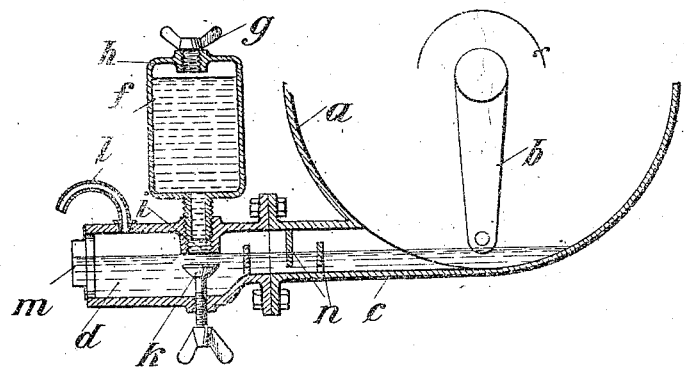

UNITED STATES PATENT OFFICE.

REINIER FREDERIK OTTO GROENINX VAN ZOELEN, OF HELDER, NETHERLANDS.

LUBRICATING DEVICE.

943,959.  Specification of Letters Patent.  Patented Dec. 21, 1909.

Application filed May 15, 1907. Serial No. 373,792.

*To all whom it may concern:*

Be it known that I, REINIER FREDERIK OTTO GROENINX VAN ZOELEN, a subject of the Queen of the Netherlands, and resident of Helder, Netherlands, have invented certain new and useful Improvements in Lubricating Devices, of which the following is a specification.

The invention relates to a device for automatically lubricating motors, machines, machine parts etc., which run in cases, such as for instance automobile motors; the invention serves on the one hand for sufficiently lubricating the parts of the machine, and on the other hand to produce an automatic delivery of the lubricant according to the consumption from a special supply vessel. Further the device is so constructed that dashing about of the lubricant, which causes especially with certain kinds of oil the formation of foam, is avoided.

The new device consists essentially of an oil chamber connected with the motor, or machine case, by means of a channel or the like. On this chamber a dropping vessel is detachably arranged, the outlet of which can be conveniently closed. The oil is prevented from dashing about by means of special contrivances, such as suitably arranged partitions, or a suitable formation and arrangement of the channel connecting the machine case and the oil chamber. The formation of foam cannot therefore take place.

In the accompanying drawing one form of construction of the new device as applied to a bicycle motor is shown.

To the case $a$, in which the crank $b$ of the motor rotates, the oil chamber $d$ is connected by means of the channel $c$. On the oil chamber $d$ is situated the dropping vessel $f$, which is screwed to the chamber so that it can be adjusted in height. The outlet $i$ can be closed by means of a seal $k$.

$l$ is an air tube and $m$ a glass for viewing the height of the oil, which are both constructed and arranged in a well-known manner.

In the construction shown in the drawing the dashing about of the oil is prevented by building partitions $n$ in the channel $c$. These partitions have openings allowing the lubricant to pass through. The rotation of the crank $b$ causes the oil to be distributed to the other parts of the motor (cylinders etc.) and as soon as the level of the oil is reduced the oil drops down from the vessel $f$, the supply being periodically supplemented through the opening $h$ closed by the screw $g$.

It is obvious that the arrangement and formation of the single parts of the device may differ from the example shown in the drawing without the scope of the invention being exceeded.

I claim:

1. The combination of a case in which a machine works, with an oil chamber, a channel connecting said oil chamber with said case, transverse partitions in said channel, said transverse partitions having openings, a dropping vessel adapted to supply lubricant to the oil chamber, a sight glass for ascertaining the height of the lubricant in the oil chamber, an air tube connected with the oil chamber, and an adjustable seal adapted to regulate the outlet of the dropping vessel, substantially as set forth.

2. The combination of a case in which a machine works, with an oil chamber, a channel connecting said oil chamber with said case, transverse partitions in said channel, said transverse partitions having openings, a dropping vessel adapted to supply lubricant to the oil chamber, said dropping vessel being adjustable in height, and detachable from the oil chamber, a sight glass for ascertaining the height of the lubricant in the oil chamber, an air tube connected with the oil chamber, and an adjustable seal passing through the bottom of the oil chamber, adapted to regulate the outlet of the dropping vessel, substantially as set forth.

In testimony whereof I have hereunto signed my name this 24th day of April 1907, in the presence of two subscribing witnesses.

REINIER FREDERIK OTTO
    GROENINX VAN ZOELEN.

Witnesses:
 AUGUST SIEGFRIED DOCEN,
 JOHAN PIETER JUGER.